(12) United States Patent
Rezkalla et al.

(10) Patent No.: US 12,214,689 B2
(45) Date of Patent: Feb. 4, 2025

(54) METHOD FOR CONTROLLING CHARGING OF ELECTRICAL STORAGE DEVICES

(71) Applicant: VESTAS WIND SYSTEMS A/S, Aarhus N (DK)

(72) Inventors: Michel Maher Naguib Rezkalla, Aarhus N (DK); Karthikeya Balladi Raghuchandra, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 458 days.

(21) Appl. No.: 17/640,302

(22) PCT Filed: May 18, 2020

(86) PCT No.: PCT/DK2020/050140
§ 371 (c)(1),
(2) Date: Mar. 3, 2022

(87) PCT Pub. No.: WO2021/043379
PCT Pub. Date: Mar. 11, 2021

(65) Prior Publication Data
US 2022/0340034 A1 Oct. 27, 2022

(30) Foreign Application Priority Data
Sep. 3, 2019 (DK) .......................... PA 2019 70552

(51) Int. Cl.
*B60L 53/63* (2019.01)
*B60L 53/62* (2019.01)
(Continued)

(52) U.S. Cl.
CPC .............. *B60L 53/63* (2019.02); *B60L 53/62* (2019.02); *B60L 53/66* (2019.02); *B60L 53/67* (2019.02);
(Continued)

(58) Field of Classification Search
CPC .......... B60L 53/63; B60L 53/62; B60L 53/66; B60L 53/67; H02J 3/322; H02J 7/00032; H02J 7/0013; H02J 7/00712
(Continued)

(56) References Cited

U.S. PATENT DOCUMENTS 10,439,394 B2 * 10/2019 Trudel .................. G01R 31/42
2012/0323396 A1 12/2012 Shelton et al.
(Continued)

FOREIGN PATENT DOCUMENTS

CN 105633988 A 6/2016
CN 108155656 A 6/2018
(Continued)

OTHER PUBLICATIONS

National Intellectual Property Administration, Notification of the First Office Action for Chinese Patent Application No. 202080061827.7, dated Apr. 25, 2024.
(Continued)

*Primary Examiner* — Richard V Muralidar
(74) *Attorney, Agent, or Firm* — Patterson + Sheridan, LLP (57) ABSTRACT

A method for controlling charging of at least one electrical storage device is disclosed. Information regarding a power grid and the at least one electrical storage device is used by an aggregator to derive a weighted distribution of virtual inertia response and fast frequency response to be provided to the power grid by the electrical storage devices. A total power available for charging the at least one electrical storage device is derived in accordance with the weighted distribution by a charging controller. An active power setpoint is derived for each of the at least one electrical storage device on the basis of at least (i) the total available power and (ii) the information regarding the at least one electrical
(Continued)

storage device. Finally, a charging state of each of the at least one electrical storage device is controlled based on the derived active power setpoint.

20 Claims, 6 Drawing Sheets

(51) Int. Cl.
    *B60L 53/66* (2019.01)
    *B60L 53/67* (2019.01)
    *H01M 10/44* (2006.01)
    *H02J 3/24* (2006.01)
    *H02J 3/32* (2006.01)
    *H02J 7/00* (2006.01)

(52) U.S. Cl.
    CPC ......... *H01M 10/44* (2013.01); *H01M 10/441* (2013.01); *H02J 3/241* (2020.01); *H02J 3/322* (2020.01); *H02J 7/00032* (2020.01); *H02J 7/0013* (2013.01); *H02J 7/00712* (2020.01); *H01M 2220/20* (2013.01)

(58) Field of Classification Search
    USPC ............... 320/109, 132; 700/22; 701/22; 702/60–65
    See application file for complete search history.

(56) References Cited

U.S. PATENT DOCUMENTS

| | | | |
|---|---|---|---|
| 2016/0190866 A1* | 6/2016 | Pelletier | G05B 15/02 307/64 |
| 2017/0207633 A1 | 7/2017 | Nakayama et al. | |

FOREIGN PATENT DOCUMENTS

| | | | |
|---|---|---|---|
| CN | 109390959 A | | 2/2019 |
| CN | 109524974 | * | 3/2019 |
| CN | 109524974 A | | 3/2019 |
| CN | 109768582 A | | 5/2019 |
| CN | 110071531 A | | 7/2019 |
| CN | 110190595 A | | 8/2019 |
| KR | 20150022732 A | | 3/2015 |
| WO | 2013149076 A1 | | 10/2013 |
| WO | 2021043379 A1 | | 3/2021 |

OTHER PUBLICATIONS

Danish Patent and Trademark Office, 1st Technical Examination including the Search Report and Search Opinion for Application PA 2019 70552 dated Feb. 25, 2020.

Yu et al. System frequency regulation in Singapore using distributed energy storage systems In: IEEE Asian Conference on Energy, Power and Transportation (ACEPT), IEEE, Oct. 24, 2017, p. 1-6; see "Introduction" and "III. Distributed energy storage systems".

Datta et al. LFC by coordinated virtual inertia mimicking and PEVs in power utility with MW-class distributed PV generation In: IEEE Control and Modeling for power electronics (COMPEL), IEEE 13th Workshop, Jun. 10, 2012, p. 1-8.

PCT, Notification of Transmittal of the International Search Report and the Written Opinion of the International Searching Authority, or the Declaration for Application PCT/DK2020/050140 dated Jul. 15, 2020.

Rezkalla Michel et al: "Comparison between synthetic inertia and dast frequency containment control based on single phase EVs in a microgrid", Applied Energy, Elsevier Science Publishers, GB, vol. 210, Jun. 23, 2017 (Jun. 23, 2017), pp. 764-775, XP085303922.

* cited by examiner

METHOD FOR CONTROLLING CHARGING OF ELECTRICAL STORAGE DEVICES

FIELD OF THE INVENTION

The present invention relates to a method for controlling charging of at least one electrical storage device, such as an electric vehicle. Furthermore, the present invention relates to a system for charging such an electrical storage device.

BACKGROUND OF THE INVENTION

The reliability of power grid operation is threatened by the shift towards a high share of converter connected distributed energy resources (DERs) replacing conventional power plants. The transition towards a higher share of DERs and renewable energy resources brings new responsibility and challenges to the distribution system operators and the transmission system operators. Frequency support will need to be provided by DERs and renewable energy resources connected to the distribution grid. The displacement of conventional generation by inertia-less resources, such as converter connected renewable energy resources, entails an increasing upsurge in the requirement for balancing and system stabilisation services.

The reduction of system inertia due to the replacement of synchronous generators by DERs has implications for system frequency stability, which include a faster rate of change of frequency. This may result in tripping of grid components, especially imbedded renewable energy resources, such as wind turbines or photovoltaic panels, conventional generation pole slipping and cascade tripping. Furthermore, higher frequency deviations, such as nadirs and/or zeniths, may occur, potentially leading to load shedding, and in the worst case power grid collapse.

Methods for stabilising power grids are known in the art, for example control of active power generation in order to stabilise the grid frequency or control of reactive power generation in order to stabilise the grid voltage. However, with a lower share of conventional power plants with a high inertia, the power grid is to a greater extent prone to changes in the operating conditions of the power grid, and therefore there is a need for alternative methods of stabilising power grids in case of faults and contingencies in the power grid.

DESCRIPTION OF THE INVENTION

It is an object of embodiments of the invention to provide a method for controlling charging of at least one electrical storage device, in which grid stability is ensured while enabling a higher penetration of renewable energy in a power grid.

It is a further object of embodiments of the invention to provide a method for controlling charging of at least one electrical storage device, in which the ancillary service quality provided by the at least one electrical storage device is improved.

According to a first aspect the invention provides a method for controlling charging of at least one electrical storage device, the method comprising the steps of:
- providing an aggregator arranged in communicative connection with a power grid and the at least one electrical storage device,
- the aggregator retrieving information regarding the power grid and the at least one electrical storage device,
- the aggregator deriving a weighted distribution of virtual inertia response and fast frequency response to be provided to the power grid by the electrical storage devices, on the basis of the retrieved information,
- the aggregator providing the derived weighted distribution of virtual inertia response and fast frequency response to a charging controller,
- the charging controller deriving a total power available for charging the at least one electrical storage device, in accordance with the weighted distribution,
- deriving an active power setpoint for each of the at least one electrical storage device on the basis of the total available power, and on the basis of the information regarding the at least one electrical storage device, and
- controlling a charging state of each of the at least one electrical storage device based on the derived active power setpoint.

Thus, according to the first aspect, the invention provides a method for controlling charging of at least one electrical storage device. In the present context the term 'at least one electrical storage device' should be interpreted to mean a device used for storing electric energy, such as a battery of an electric vehicle.

The at least one electrical storage device is in communicative connection with an aggregator. In the present context, the term 'aggregator' should be interpreted to mean a unit that is in communicative connection with one or more units, and which retrieves and/or provides information from/to the one or more units. Thus, the aggregator may have a general overview of the one or more units, which are in communicative connection with the aggregator, and may further comprise information regarding the one or more units. The aggregator may collectively process the retrieved information from the one or more units and/or it may provide the retrieved information to another unit for processing.

Thus, the aggregator may offer an overview of the information regarding the one or more units, which are in communicative connection with the aggregator, and provides the retrieved information to other units. Furthermore, the aggregator may collectively process the retrieved information and/or distribute the retrieved and/or processed information to other units.

The aggregator is typically responsible for handling a plurality of electrical storage devices, e.g. including a fleet of electric vehicles, including ensuring that each electrical storage device is charged in accordance with various requirements. Furthermore, the aggregator may be responsible for providing relevant information from the electrical storage devices it is responsible for to the power grid and vice versa.

Furthermore, the aggregator is in communicative connection with a power grid. In the present context the term 'power grid' should be interpreted to mean an interconnected electrical network for delivering electrical power from producers to consumers. The power grid may have different topologies. Examples of such topologies are, e.g., radial power grids and meshed power grids.

The aggregator retrieves information regarding the power grid and the at least one electrical storage device. The information regarding the power grid may be related to requirements set by a transmission system operator and/or information related to faults and/or contingencies in the power grid. The requirements from the transmission system operator may, e.g., include requirements and/or limits for voltage, active power, reactive power and frequency, etc. Alternatively or additionally, the information regarding the power grid may be measurements related to the power grid, such as, frequency, active power, reactive power, or voltage measurements.

Alternatively or additionally, the information regarding the power grid may include information regarding an electricity market. The electricity market may be a system where transactions involving electricity are conducted. The electricity market may enable purchases, sales, etc., e.g. based on supply and demand principles to set the price. Thus, information regarding the electricity market may include information regarding supply and demand for power in the power grid, prices, etc. For instance, information regarding prices may include information regarding the current obtainable price for providing virtual inertia response to the power grid and the current obtainable price for providing fast frequency response to the power grid.

The information regarding the at least one electrical storage device may include, but are not limited to, an activity status, a power capacity, a state of charge, a degradation model of the electrical storage device and/or a charging pattern of the at least one electrical storage device.

The activity status of the at least one electrical storage device may be used for identifying whether or not, and to which extent, each of the at least one electrical storage device is available for charging, and/or information regarding during which time intervals the electrical storage device is available/unavailable.

The power capacity of the at least one electrical storage device may indicate the maximum amount of energy that may be stored in the at least one electrical storage device.

The state of charge of the at least one electrical storage device may indicate the level of charge of each of the at least one electrical storage device relative to its power capacity, i.e., how much energy is stored in each of the at least one electrical storage device, and how much free storing capacity each electrical storage device possesses.

The degradation model of the electrical storage device may indicate the working life time of the electrical storage device, i.e. how long the electrical storage device can operate appropriately before a replacement is required. The degradation model may be represented as the number of charge cycles or a time interval until the end of useful life of the electrical storage device.

The charging pattern of the at least one electrical storage device may indicate a charging speed or charging rate at which each of the at least one electrical storage device charges. A faster charging speed means that less time is required in the total charging process and vice versa.

Next, the aggregator derives a weighted distribution of virtual inertia response and fast frequency response to be provided to the power grid by the electrical storage devices, on the basis of the retrieved information. The virtual inertia response may be a property which acts to overcome the immediate imbalance between supply and demand in the power grid.

After a power imbalance, the power grid frequency may either decrease or increase, and the gradient of the frequency deviation may depend on the load and/or generation step amplitude and the amount of kinetic energy stored and released by synchronously connected rotating masses of the power grid. The virtual inertia response may thus aim at emulating the same effects of the system inertia limiting the rate of change of frequency (RoCoF), and the virtual inertia response is accordingly sensitive to df/dt. Thus, virtual inertia response changes power output as a function of df/dt.

The fast frequency response may be defined as the frequency response of electrical storage devices coupled to the power grid following a power imbalance, such as a sudden loss of generation or load. The fast frequency response may counteract the frequency deviation from the nominal value, e.g. 50 Hz, after a power imbalance, within a predefined range. A power grid operating with substantially 50 Hz may, e.g., have a predefined range in the power grid frequency of +/−0.5%. Thus, the fast frequency response may aim at limiting the frequency nadir and steady state value deviation of the power grid frequency, and the fast frequency response is accordingly sensitive to frequency deviations. Thus, fast frequency changes power output as a function of frequency deviation.

Thus, the virtual inertia response reacts to df/dt, whereas the fast frequency response reacts to frequency deviations. The derived weighted distribution of virtual inertia response and fast frequency response thereby reflects the needs of the power grid to receive support with regard to these two issues. The weighted distribution of virtual inertia response and fast frequency response to be provided to the power grid derived by the aggregator may be a percentage-wise distribution of virtual inertia response and fast frequency response required by the power grid.

Since the weighted distribution is derived on the basis of the retrieved information regarding the power grid and the at least one electrical storage device, the resulting weighted distribution depends on this information, and therefore changes in the information regarding the power grid and the at least one electrical storage device will be reflected in the derived weighted distribution.

Thus, the weighted distribution derived by the aggregator provides a measure for the ratio between virtual inertia response and fast frequency response which the at least one electrical storage device has to provide to the power grid. Accordingly, the weighted distribution imposes restrictions on how the charging state of the electrical storage device(s) can be controlled.

Next, the aggregator provides the derived weighted distribution of virtual inertia response and fast frequency response to a charging controller. The charging controller may be configured to control each of the at least one electrical storage device on the basis of the weighted distribution. Thus the charging controller may be in communicative connection with the aggregator and each of the at least one electrical storage device.

Next, the charging controller derives a total power available for charging the at least one electrical storage device, in accordance with the weighted distribution. Since the total available power is derived on the basis of the weighted distribution, the resulting total available power depends on this information, and therefore the weighted distribution is reflected in the derived total available power, i.e. the total available power reflects the ratio between virtual inertia response and fast frequency response which the electrical storage device(s) must provide to the power grid.

The total available power may be a measure of the amount of power which the charging controller has at its disposal for charging the electrical storage device(s) which the charging controller is responsible for. In this case, the total available power may be a measure of the total amount of power which is available for charging all of the at least one electrical storage device. In the case that there are two or more electrical storage devices, the total available power is the power available for distribution among the electrical storage devices. At the same time, the total available power provides a measure of the amount of virtual inertia response and fast frequency response to be provided to the power grid by the at least one electrical storage device.

Next, an active power setpoint for each of the at least one electrical storage device is derived on the basis of the total available power, and on the basis of the information regarding the at least one electrical storage device. The active power setpoint(s) may, e.g., be derived by the charging controller. As an alternative, the active power setpoint(s) may be derived by another entity, and may subsequently be supplied to the charging controller.

Each of the active power setpoint(s) is a setpoint value which can be used for controlling the charging state of the relevant electrical storage device. Thus, in this step a control setpoint for each for each of the electrical storage device(s) is derived, indicating exactly how the charging state of the individual electrical storage should be controlled.

Since the active power setpoint for each of the electrical storage device(s) is derived on the basis of the derived total available power, which reflects the weighted distribution, as described above, the active power setpoint(s) also reflect the weighted distribution in the sense that the active power setpoint(s) is/are derived in such a manner that when all of the electrical storage device(s) is/are controlled in accordance with their respective active power setpoints, the resulting response from all of the electrical storage device(s) is in accordance with the requirements dictated by the weighted distribution, i.e. the resulting response to the power grid fulfils these requirement. Accordingly, it is ensured that the required ratio of virtual inertia response and fast frequency response is provided to the power grid.

Each of the derived active power setpoint(s) may reflect the weighted distribution, in which case each of the electrical storage device(s) fulfils the requirements described above. Alternatively, the individual active power setpoint(s) may not reflect the weighted distribution, as long as the active power setpoint(s) in combination reflect the weighted distribution.

In any event, the active power setpoint for a given electrical storage device provides a measure of the amount of virtual inertia response and fast frequency response to be provided by that electrical storage device to the power grid.

The active power setpoint may be an amount of active power that each of the at least one electrical storage device may be charged with. The amount of active power may be a percentage-wise distribution of the total available power that each of the at least one electrical storage device may be charged with. The percent-wise distribution of the total available power may be distributed among each of the at least one electrical storage device on the basis of the information regarding the at least one electrical storage device. Thus, the active power setpoint may vary for each of the at least one electrical storage device, or it may be the same.

Furthermore, the active power setpoint(s) for one or more electrical storage device(s) may include a percentage of the total power capacity of each of the electrical storage device(s), i.e. how much of the total power capacity of each of the electrical storage device(s) may be charged.

Alternatively or additionally, the active power setpoint(s) for one or more electrical storage device(s) may include a setpoint for minimum and/or maximum state of charge of each of the at least one electrical storage device, i.e., the minimum and/or maximum amount of energy that may be stored in each of the at least one electrical storage device. In this case, the active power setpoint provides a measure of the minimum and/or maximum amount of virtual inertia response and fast frequency response to be provided to the power grid by the at least one electrical storage device. Thereby, each of the at least one electrical storage device may be charged in accordance with the active power setpoint.

Finally, the charging controller controls a charging state of each of the at least one electrical storage device based on the derived active power setpoint. The charging state may be controlled based on the information regarding the at least one electrical storage device.

Since the charging state of each of the at least one electrical storage device is controlled based on the corresponding derived active power setpoint, it is ensured that the ratio of virtual inertia response and fast frequency response which is required by the weighted distribution is actually provided to the power grid by the electrical storage device(s) in combination.

It is an advantage that the active power setpoints used for controlling the electrical storage devices are derived in a such a manner that the weighted distribution of virtual inertia response and fast frequency response is reflected, as described above, because thereby it is ensured that a required virtual inertia response as well as a required fast frequency response is provided by the electrical storage devices to the power grid. Thereby the electrical storage devices are capable of performing tasks, which are normally performed by high inertia units, such as traditional power plants, in order to ensure stability of the power grid, i.e. the electrical storage devices are able to perform ancillary services. This allows a larger portion of such high inertial units to be replaced by renewable power sources, such as wind turbines, photovoltaic panels, etc., without risking instability of the power grid.

At least two electrical storage devices may be communicatively connected to the aggregator, and the charging state of the at least two electrical storage devices may be controlled. According to this embodiment, there are at least two electrical storage devices having their charging state controlled, and the total available power needs to be distributed appropriately among those electrical storage devices, while ensuring that the weighted distribution of virtual inertia response and fast frequency response is complied with.

As described above, the active power setpoint(s) is derived for each of the electrical storage device(s) on the basis of the total available power, which reflects the weighted distribution. Accordingly, when all of the electrical storage device(s) is/are controlled in accordance with their respective active power setpoints, the resulting response from all of the electrical storage device(s) is in accordance with the requirements dictated by the weighted distribution. Thus, when there are two or more electrical storage devices, the active power setpoints of each electrical storage device may not necessarily reflect the weighted distribution, as long as it is ensured that the active power setpoints in combination do so. For instance, the active power setpoints may be derived in such a manner that some of the electrical storage devices are controlled to provide only virtual inertia response, while other electrical storage devices are controlled to provide only fast frequency response. Alternatively or additionally, at least some of the electrical storage devices may be controlled to provide virtual inertia response as well as fast frequency response, but not necessarily in accordance with the weighted distribution. This allows the active power setpoints to be derived in such a manner that needs of the individual electrical storage devices can also be taken into account. Furthermore, the electrical storage devices which are best suited for providing virtual inertia response can be controlled in a manner which ensures that these electrical storage devices provide virtual inertia response to a greater extent than the other electrical storage devices. Similarly, the electrical storage devices which are best suited for providing fast frequency response can be controlled in manner which ensures that these electrical storage devices provide fast frequency response to a greater extent than the other electrical storage devices.

The charging controller may be a charging hub controller being arranged to control the charging state of the at least two electrical storage devices.

According to this embodiment, a single controller, i.e. the charging hub controller, controls the charging of all of the electrical storage devices, rather than providing each electrical storage device with a separate controller.

Since the charging hub controller controls the charging states of all of the electrical storage devices, it is capable of deriving active power setpoints for each of the at least two electrical storage devices, which in combination reflect the weighted distribution, but which do not necessarily individually reflect the weighted distribution.

The charging hub controller may help reducing the number of charging controllers needed in order to control the charging state of each of the at least two electrical storage devices, thus reducing space in a system comprising several electrical storage devices. By reducing the number of charging controllers, the system may be more simple and manageable. Furthermore, costs related to the production of the charging controller may accordingly be reduced.

Furthermore, by having a charging hub controller controlling the charging of at least two electrical storage devices, a higher controllability of the electrical storage devices may be obtained due to more information related to the at least two electrical storage devices being provided by the aggregator. Thereby, the aggregator may provide a weighted distribution and information to the charging hub controller, enabling it to control the charging states of the at least two electrical storage devices in a more customised manner.

Alternatively or additionally, each of the electrical storage devices may be provided with a separate controller, or one or more controllers may be provided for controlling two or more, but not all of, the electrical storage devices.

At least one of the electrical storage device(s) may be an electric vehicle. In the present context the term 'electric vehicle' should be interpreted to mean a vehicle that runs on electricity and uses one or more electric motors for propulsion. The electric vehicle may comprise an electrical storage device, such as a battery, in which electricity may be stored during charging of the electric vehicle, and used as a transportation fuel for the electric motors of the electric vehicle during use of the electric vehicle.

It may be possible for the charging controller to only charge the electric vehicle, i.e. discharging the electric vehicle may not be allowed. Thus, the charging controller may not be able to discharge the electric vehicle. Thereby, the electric vehicle may be able to provide virtual inertia response and/or fast frequency response to the power grid when being charged, and thereby participate in supporting the power grid in case of an imbalance in the power grid. Such electric vehicles may be referred to as having a unidirectional power flow.

Thus, according to this embodiment, the required supporting of the power grid is provided solely by charging one or more electric vehicles in an appropriate manner, i.e. in accordance with active power setpoint(s), which reflect the weighted distribution of virtual inertia response and fast frequency response to be provided to the power grid.

As an alternative, the electric vehicle may be of a kind having a bidirectional power flow, i.e. of a kind which may receive as well as provide power from/to the power grid. In this case the electric vehicle may, in addition to being charged, also be discharged, in order to provide the required virtual inertia response and/or fast frequency response to the power grid. This will be described in further detail below.

Alternative or additionally, at least one of the electrical storage device(s) may be a battery. According to this embodiment, the battery is a device in which electric energy may be stored when needed and released when required. Thus, it may be possible to charge as well as to discharge such a battery. Thereby, the battery may be able to provide virtual inertia response and/or fast frequency response to the power grid when required, and thereby participate in supporting the power grid in case of an imbalance in the power grid. Furthermore, the battery may be used as an energy buffer.

Preferably, a battery is provided in addition to at least one electrical storage device which the charging controller is not allowed to discharge, such as an electric vehicle.

The information regarding the power grid may comprise a grid frequency. The grid frequency may be measured at a point in the power grid, and retrieved by the aggregator. Furthermore, the grid frequency may be used for deriving the rate of change of frequency, which may be the change in grid frequency over time. A high rate of change of frequency may indicate a power grid with low inertia, while a low rate of change of frequency may indicate a power grid with high inertia. Thus, by retrieving information regarding the grid frequency of the power grid, information may be determined about the required virtual inertia response and fast frequency response.

Alternatively or additionally, it may be possible to derive a droop characteristic for each of the at least one electrical storage device based on the grid frequency and on the basis of the information regarding the at least one electrical storage device. The droop characteristic may show the change in active power for the at least one electrical storage device as a function of frequency. Alternatively or additionally, the droop characteristic may show the change in active power for the at least one electrical storage device as a function of the rate of change of frequency. The droop characteristic may be used for controlling the grid frequency of the power grid by controlling the active power flow in each of the at least one electrical storage device.

Alternatively or additionally, it may be possible to derive a deadband for the droop characteristic for each of the at least one electrical storage device. A deadband is a band of input values, in the domain of a transfer function in a control system or signal processing system where the output is zero. Thus, for a value on the x-axis of the droop characteristic, the resulting value on the y-axis will be unchanged. Therefore, when the droop characteristic is in a deadband, no control action is taken.

Furthermore, the droop characteristic may be used for deriving active power limits for each of the at least one electrical storage device, i.e. the minimum or maximum amount of power that may be stored in each of the at least one electrical storage device at a given frequency.

The information regarding the power grid may comprise information regarding active power. Active power is a measure for the active power generation in the power grid. When a disturbance occurs in the system, e.g., short-circuit fault, trip, overhead-line breaking, system disintegration, etc., it may result in imbalance between a total generation power and a total load power. If the total generation power is more than the total load power, including the grid losses, the system frequency will increase, otherwise, if the total generation power is less than the total load power, the system frequency will decrease, indicating an instability of the power grid. When this occurs, it is desirable to counteract such frequency changes, e.g. by adjusting the ratio between virtual inertia response and fast frequency response to be provided to the power grid.

Since the active power is a measure for the power generation in the power grid, as described above, the active power will reflect such frequency changes. Thus, the active power provides information regarding whether or not an adjustment of the ratio between virtual inertia response and fast frequency response to be provided to the power grid, i.e. an adjustment of the weighted distribution, is required.

The information regarding active power may be retrieved by the aggregator.

Furthermore, the active power may be a measured active power value at a point in the power grid.

Alternatively or additionally, the information regarding the power grid may include information regarding an electricity market, as described above.

The method may further comprise the step of deriving a current setpoint for each of the at least one electrical storage device based on the derived active power setpoint, and the step of controlling a charging state of each of the at least one electrical storage device may further be based on the current setpoint.

According to this embodiment, the charging states of the electrical storage devices are controlled based on a current setpoint, rather than on an active power setpoint. The current setpoint is derived based on the active power setpoint. The current setpoint may be an amount of current corresponding to an amount of active power that each of the at least one electrical storage device may be charged with. The current setpoint may be derived by the charging controller by dividing the active power setpoint with the voltage across each of the at least one electrical storage device. Thus, according to this embodiment, the current that is provided to each of the at least one electrical storage device for charging is accordingly controlled.

Alternatively, a look-up table may used for deriving a current setpoint which is in accordance with the active power setpoint.

As another alternative, the charging states of the electrical storage devices may be controlled directly on the basis of the respective active power setpoints.

As an even further alternative, a voltage setpoint for each of the at least one electrical storage device may be derived, wherein the voltage setpoint may indicate a voltage level, that the at least one electrical storage device may have. The charging state of each of the at least one electrical storage device may thus be controlled to reach this voltage level.

The step of controlling the charging state of each of the at least one electrical storage device may comprise controlling at least one charging equipment. The charging equipment will typically be arranged at various positions where charging of mobile electrical storage devices, such as electric vehicles, may be relevant, such as public charging stations, garages, etc. On the other hand, the aggregator and the charging hub may be arranged at a central position, such as at a control centre. Thus, the active power setpoints may be derived centrally, taking various considerations into account, even though the actual control of the charging states of the electrical storage devices takes place decentrally and at various positions. The charging equipment may be in communicative connection with the charging controller, and may further control the charging state of each of the at least one electrical storage device on the basis of the current setpoint.

The charging controller may derive the current setpoint, and provide the derived current setpoint to the charging equipment.

The step of deriving a current setpoint for each of the at least one electrical storage device may include deriving a duty cycle of a PWM signal. According to this embodiment, the duty cycle is the fraction of one period in which, e.g., a signal is active, wherein a period may be the time it takes for a signal to complete an on-and-off cycle. The duty cycle may be expressed as a percentage or a ratio, and may indicate a time period for charging each of the at least one electrical storage device.

The duty cycle may be derived by the charging equipment, and may be derived on the basis of the current setpoint. A high current setpoint may indicate a high duty cycle, i.e. a long charging period, and a low current setpoint may indicate a low duty cycle, i.e. a short charging period. Thus, the charging equipment may, e.g., charge the at least one electrical storage device during an on-period, and stop the charging of the at least one electrical storage device during an off-period.

By deriving a duty cycle of a PWM signal, the controller which controls the charging state of the individual electrical storage device is provided with exact information regarding starting/stopping of the charging of the electrical storage device, since this is clearly defined by the duty cycle. Thereby, the at least one electrical storage device may be effectively charged.

According to one embodiment, at least two electrical storage devices may be communicatively connected to the aggregator, and the step of deriving the active power setpoint for the at least one electrical storage device may comprise the steps of:

selecting at least one first electrical storage device for providing virtual inertia response and at least one second electrical storage device for providing fast frequency response, in accordance with the weighted distribution, and on the basis of the information regarding the electrical storage devices, deriving an active power setpoint for each of the first electrical storage devices being purely virtual inertia response, and deriving an active power setpoint for each of the second electrical storage devices being purely fast frequency response.

According to this embodiment, at least two electrical storage devices are communicatively connected to the aggregator, essentially as described above. Furthermore, according to this embodiment, the step of deriving the active power setpoints for the electrical storage devices is performed by initially selecting at least one first electrical storage device and at least one second electrical storage device. The first electrical storage device(s) may advantageously be of a kind which is particularly suitable for providing virtual inertia response to the power grid, and the second electrical storage device(s) may advantageously be of a kind which is particularly suitable for providing fast frequency response to the power grid.

The first electrical storage device(s) and the second electrical storage device(s) are selected based on the information regarding the electrical storage device, e.g., information regarding the capability of providing virtual inertia response and/or fast frequency response of the individual electrical storage devices. As described above, some of the electrical storage devices may be better suited for providing virtual inertia response, while other electrical storage devices may be better suited for providing fast frequency response.

Alternatively or additionally, at least some of the electrical storage devices may be equally well suited for providing virtual inertia response as well as fast frequency response. Thus, the electrical storage devices may be selected based on their capability of providing virtual inertia response and/or fast frequency response to the power grid, while ensuring that the virtual inertia response and fast frequency response to be provided to the power grid by all electrical storage device in total is in accordance with the weighted distribution. The selection of the electrical storage devices may be performed by the aggregator, which possesses the information regarding the electrical storage devices, and is responsible for deriving the weighted distribution.

Next, an active power setpoint for each of the first electrical storage devices and an active power setpoint for each of the second electrical storage devices are derived. This is done in such a manner that the active power setpoint for each of the first electrical storage devices is purely virtual inertia, and the active power setpoint for each of the second electrical storage devices is purely fast frequency response. Thus, when the electrical storage devices are subsequently controlled in accordance with the active power setpoints, the first electrical storage devices provide only virtual inertia response, and the second electrical storage devices provide only fast frequency response. It is not ruled out, that there are further electrical storage devices which provide virtual inertia response as well as fast frequency response.

Thus, according to this embodiment, the required weighted distribution of virtual inertia response and fast frequency response to be provided to the power grid is obtained by appropriately dividing the available electrical storage devices into electrical storage devices providing virtual inertia response and electrical storage devices providing fast frequency response.

Since the active power setpoints are derived based on the total power available, it may in this case be appropriate to provide the total available power in the form of two signals, one representing virtual inertia response to be provided to the power grid, and one representing fast frequency response to be provided to the power grid. Thereby the active power setpoints for the first electrical storage devices can be derived solely based on the total available power signal which represents virtual inertia response, and the active power setpoints for the second electrical storage devices can be derived solely based on the total available power signal which represents fast frequency response. This may ease the derivation of the active power setpoints being purely related to virtual inertia response and fast frequency response, respectively, due to the direct link between the total available power signals and the active power setpoint being purely virtual inertia response or being purely fast frequency response.

As an alternative, the total power available may be provided as one signal, reflecting the weighted distribution, and all of the active power setpoints may be derived therefrom. In this case, the total available power may need to be split into a term representing the virtual inertia response and another term representing the fast frequency response before deriving the active power setpoints.

As an alternative, all or some of the electrical storage devices may be controlled to provide virtual inertia response as well as fast frequency response. In this case, each electrical storage device may be controlled to provide the weighted distribution of virtual inertia response to the power grid, or the distribution provided by the individual electrical storage devices may differ, as long as the total response from all of the electrical storage devices fulfils the weighted distribution.

The information regarding the at least one electrical storage device may be provided to the aggregator by a Software-as-a-Service (SaaS) platform. The SaaS platform may be in the form of a cloud service where information regarding the electrical storage device(s) may be obtained from the electrical storage device(s) and made available to the aggregator. The cloud service may comprise servers and/or data centres being accessible to one or more users via a global communication network, such as the Internet, and where any required software is maintained, in the form of a service provided by the SaaS provider. Thereby the aggregator may obtain data regarding the electrical storage device(s) without the aggregator being in direct communicative connection with the electrical storage device(s). Thus, the SaaS platform may be seen as an intermediate platform adapted to obtain relevant information, at least regarding the electrical storage devices, and to establish communication between the electrical storage devices and the aggregator. For instance, the SaaS platform may obtain information regarding the electrical storage devices, and it may further communicate the active power setpoints to the electrical storage devices, once these have been derived.

The information regarding the electrical storage devices may be obtained directly from the electrical storage devices, e.g. by the electrical storage devices communicating relevant information to the SaaS platform, or by the SaaS platform monitoring the electrical storage devices. Alternatively or additionally, information, e.g. regarding expected availability of the electrical storage device, time constraints for fully charge of the electrical storage device, etc., may be provided manually, e.g. by the owner or user of the electrical storage device. This could, e.g., be performed via a mobile device, such as a cell phone, a tablet or a laptop computer, possibly having appropriate software, e.g. in the form of an app, installed thereon.

The information regarding the at least one electrical storage device may comprise, but is not limited to, information regarding a state of charge, charging patterns, the availability of the at least one electrical storage device, a degradation model of the electrical storage device and/or a minimum/maximum state of charge required by the at least one electrical storage device.

The step of controlling a charging state of each of the at least one electrical storage device may comprise charging at least one of the at least one electrical storage device. According to this embodiment, the at least one electrical storage device is being charged rather than being discharged. Thereby, the charging state of an electrical storage device, such as an electric vehicle and/or a battery, may be controlled such that the electric vehicle and/or the battery may be charged, i.e. the charging state is increased. However, as described above, once the electrical energy has been provided to the electrical storage devices, it may no longer be accessible for the power grid, i.e. discharging of the electrical storage devices may not be an option.

In case there is an excess of power in the power grid, the at least one electrical storage device may help keeping the power grid stable by absorbing power from the power grid. This may be performed by controlling the charging state of each of the at least one electrical storage device by charging at least one of the electrical storage device. Thus, charging the at least one electrical storage device during a power imbalance in the power grid may help stabilise the power grid.

The step of controlling a charging state of each of the at least one electrical storage device may comprise discharging at least one of the at least one electrical storage device, thereby providing active power support to the power grid. In this case the electrical storage device may be a battery, as described above. According to this embodiment, the at least one electrical storage device is discharged by controlling the charging state of each of the at least one electrical storage device. Thereby, the charging state of an electrical storage device, such as a battery, may be controlled such that the battery may be discharged.

In the case that there is a deficit of power in the power grid, the at least one electrical storage device, such as a battery, may help keeping the power grid stable by providing power to the power grid. This may be performed by controlling the charging state of each of the at least one electrical storage device, such that the at least one electrical storage device is discharged. Thus, discharging the at least one electrical storage device during a power imbalance in the power grid may help stabilise the power grid.

At least one of the at least one electrical storage device being discharged may be an electric vehicle with bidirectional charging capability, the information regarding the at least one electrical storage device may comprise information regarding the charging state of the electric vehicle with bidirectional charging capability, and the step of discharging the electric vehicle may only be performed if the charging state of the electric vehicle is above a predefined threshold value.

According to this embodiment, at least one electric car is capable of receiving power from the power grid, by charging the electric vehicle, and of providing power to the power grid, by discharging the electric vehicle. Thus, the electric vehicle is also capable of assisting in stabilising the power grid during power deficiency, contrary to electric vehicles with unidirectional charging capability.

Accordingly, the ancillary services provided by the electric vehicle are more extensive, and for instance, the electric vehicle is capable of providing ancillary services to the power grid, in the form of virtual inertia response and/or fast frequency response, even if the electric vehicle is fully charged.

In the case that the electrical storage devices are in the form of a large fleet of electric vehicles, being managed by the aggregator, there will always be some of the electric vehicles which are available of charging and some of the electric vehicles which are available for discharging. Accordingly, the fleet of electric vehicles, as a whole, will most likely be able to provide the required services to the power grid, in particular required virtual inertia response and fast frequency response, at any times.

In addition to providing virtual inertia response and fast frequency response, the electric vehicles may also provide further ancillary services to the power grid. Such ancillary services may, e.g., include voltage control, congestion management, demand side response, peak shaving, etc. Furthermore, the electric vehicles may be applied during black start of the power grid. The individual electric vehicles of the fleet, or groups of electric vehicles of the fleet, may be assigned to provide various ancillary services, e.g. based on information regarding their location, their charging state, etc.

The information regarding the at least one electrical storage device may comprise information regarding the charging state for at least some of the at least one electrical storage device. This may include information regarding the charging state of all of the electrical storage devices, or merely information regarding the charging state of some of the electrical storage devices. At least information related to electrical storage devices being in need of charging may be provided, while information regarding fully charged electrical storage devices, or electrical storage devices which are for other reason not in need of charging might not be provided to the aggregator.

The aggregator may use the information regarding the charging state to determine the amount of electrical storage device(s) being in need of charging, and thereby the amount of electrical storage devices being available for ensuring that the required weighted distribution of virtual inertia response and fast frequency response is provided to the power grid. Thus, the information regarding the charging state may help identifying whether or not, and to which extent, each of the at least one electrical storage device(s) is available for charging.

The step of deriving a weighted distribution of virtual inertia response and fast frequency response may be repeated at predefined time intervals.

Various parameters of the power grid, such as frequency, active power, reactive power, etc. may change over time, and therefore the information regarding the power grid used for deriving the weighted distribution at a point in time may not be the same as the information regarding the power grid at another point in time. Thus, it may be necessary to repeatedly retrieve information regarding the power grid over time, in order to ensure that the weighted distribution which is used for deriving the total power available, at all times reflects the actual requirements of the power grid. If the parameters of the power grid change, the weighted distribution may no longer represent the amount of virtual inertia response and fast frequency response to be provided to the power grid by the electrical storage device(s), hence the weighted distribution has to be recalculated. Thus, in order to counteract possible changes in the power grid, the weighted distribution may be recalculated at predefined time intervals.

Thus, by repeating the step of deriving the weighted distribution, it can be ensured that the weighted distribution of virtual inertia response and fast frequency response is always in accordance with requirements of the power grid, regardless of whether or not changes occur in the power grid. Thereby, the virtual inertia response and fast frequency response to be provided to the power grid may be better monitored, and the charging state of each of the at least one electrical storage device may be controlled in a manner which fulfils the requirements imposed by the weighted distribution.

The predefined time intervals may be fixed time intervals ranging from a few minutes to several hours. The predefined time interval may, alternatively or additionally, be triggered by an event, such as a need for power from the power grid, a fault or a contingency in the power grid or a disconnection of one or more electrical storage devices. Alternatively, the predefined time interval may be driven by the electricity market, wherein the electricity market may send a signal indicating the start and/or end of the predefined time interval.

According to a second aspect, the invention provides a system for charging at least one electrical storage device, the system comprising an aggregator being configured to retrieve information from a power grid and the at least one electrical storage device, and to derive a weighted distribution of virtual inertia response and fast frequency response to be provided to the power grid; a charging controller arranged in communication with the aggregator, and configured to derive a total power available for charging and an active power setpoint for each of the at least one electrical storage device, wherein the charging of the at least one electrical storage device is controlled in accordance with a method according to the first aspect of the invention.

Thus, according to the second aspect, the invention provides a system for charging at least one electrical storage device. The system comprises an aggregator and a charging controller. The aggregator retrieves information from a power grid and the at least one electrical storage device, and derives a weighted distribution of virtual inertia response and fast frequency response to be provided to the power grid. Thus, the aggregator may be in communicative connection with the power grid and the at least one electrical storage device. The aggregator is further in communication with a charging controller, wherein the aggregator may provide the weighted distribution to the charging controller.

The charging of the at least one electrical storage device is controlled in accordance with the method according to the first aspect of the invention. The remarks set forth above are therefore equally applicable here.

Thus, the system according to the second aspect of the invention is configured to charge the at least one electrical storage device by means of an aggregator and a charging controller for the reasons set forth above with reference to the first aspect of the invention.

BRIEF DESCRIPTION OF THE DRAWINGS

The invention will now be described in further details with reference to the accompanying drawings, in which.

DETAILED DESCRIPTION OF THE DRAWINGS

Figure 1:
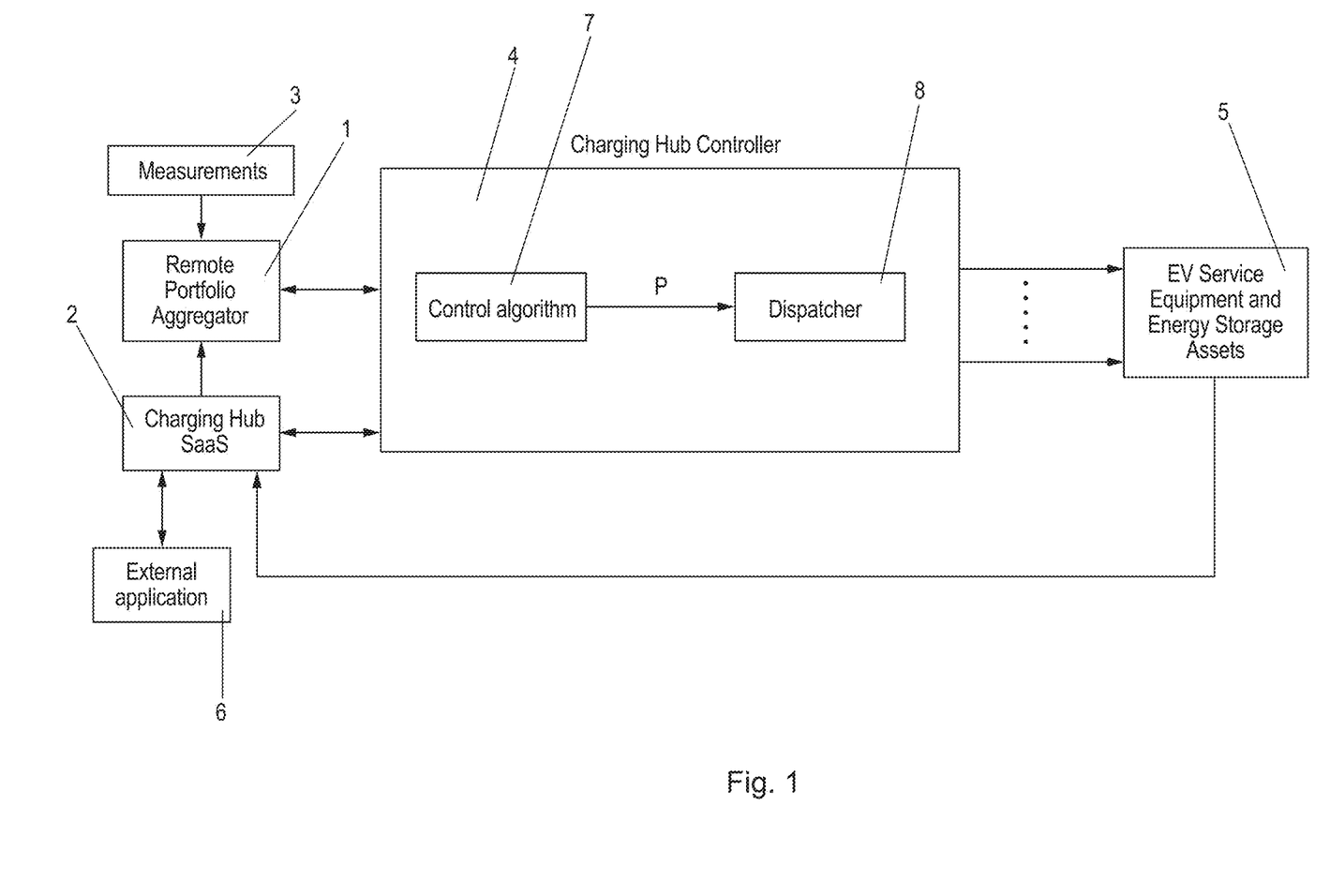
FIG. 1 is a block diagram illustrating a method according to a first embodiment of the invention.

FIG. 1 is a block diagram illustrating a method according to a first embodiment of the invention. An aggregator 1 is in communicative connection with a charging hub SaaS 2 and a charging hub controller 4. The charging hub controller 4 is arranged to control the charging state of at least one electrical storage device 5, which could, e.g., be in the form of one or more electric vehicles.

The charging hub SaaS 2 is in communicative connection with the electrical storage device 5 and is therefore capable of obtaining information regarding the electrical storage device 5, e.g. in the form of charging pattern, a power capacity, charging state, availability for charging, etc.

The charging hub SaaS 2 is further in communicative connection with an external application 6, in which the charging hub SaaS 2 and the external application 6 are able to provide information to each other. The external application 6 may be a software application in the form of, e.g., an app, installed on a mobile device, such as a cell phone, a tablet or a laptop computer. Thus, it is possible for a user of the electrical storage device 5, or the like, to manually provide further information regarding the electrical storage device 5, such as expected availability of the electrical storage device 5, time constraints for fully charge of the electrical storage device 5, etc. to the charging hub SaaS 2, using the external application 6.

Thus, the charging hub SaaS 2 obtains various information regarding the electrical storage devices 5 from various sources, notably directly from the electrical storage devices 5 and from the external application 6.

The retrieved information regarding the electrical storage device 5 is provided from the charging hub SaaS 2 to the aggregator 1.

The aggregator 1 further receives various measurements 3. The measurements 3 may, e.g., be measurements from a power grid (not shown), e.g. in relating to frequency, active power, reactive power, voltage, market information, and/or other kinds of measurements which provide information regarding the state of the power grid.

Thus, the aggregator 1 receives information regarding the electrical storage devices 5, via the charging hub SaaS 2, as well as information regarding the power grid.

Based on this information, the aggregator 1 derives a weighted distribution of virtual inertia response and fast frequency response to be provided to the power grid. The weighted distribution is a measure for the ratio between virtual inertia response and fast frequency response which the at least one electrical storage device 5 has to provide to the power grid.

The derived weighted distribution is provided from the aggregator 1 to the charging hub controller 4. As described above, the charging hub controller 4 is arranged to control the charging state of at least one electrical storage device 5.

The charging hub controller 4 further receives information regarding the electrical storage device 5 from the charging hub SaaS 2.

Thus, the charging hub controller 4 receives the weighted distribution via the aggregator 1, and further receives information regarding the electrical storage devices 5, via the charging hub SaaS 2.

The charging hub controller 4 derives a total power available for charging the at least one electrical storage device 5, in accordance with the weighted distribution, and using a control algorithm 7. The total power available is a measure of the amount of power which the charging hub controller 4 has at its disposal for charging the at least one electrical storage device 5. Since the total available power is derived based on the weighted distribution, it reflects this distribution, and is therefore a measure of the amount of virtual inertia response and fast frequency response to be provided to the power grid by the electrical storage device 5.

The derived total available power is provided from the control algorithm 7 to a dispatcher 8. The dispatcher 8 is arranged to dispatch the total available power among the electrical storage device(s) 5, based on the total available power and on the basis of the information regarding the electrical storage device(s) 5, which was received from the charging hub SaaS 2. Thus, the dispatcher 8 determines how the total available power is to be distributed among the electrical storage device(s) 5, in order to fulfil requirements of the power grid, notably with respect to the ratio of virtual inertia response and fast frequency response, as well as in order to fulfil requirements of the individual electrical storage device 5, and ensures that the total available power is actually distributed in this manner.

Thus, the dispatcher 8 derives an active power setpoint for each of the electrical storage devices 5 based on the total available power, and on the basis of the information regarding the electrical storage device 5. Each of the active power setpoints derived in this manner represents a setpoint which specifies how the charging state of a given electrical storage device must be controlled. Since the active power setpoints are derived on the basis of the total available power, which reflects the weighted distribution of virtual inertia response and fast frequency response to be provided to the power grid, the active power setpoints also reflect this weighted distribution. It is therefore ensured that all of the active power setpoints, in combination, reflect the weighted distribution, even though it may not be reflected separately by each of the active power setpoints.

The derived active power setpoint for each of the electrical storage devices 5 is provided from the charging hub controller 4 to the corresponding electrical storage device 5. Finally, the charging state of each of the electrical storage devices 5 is controlled based on the respective active power setpoints. Thereby it is ensured that the charging states of the electrical storage devices 5, in combination, are controlled in a manner which ensures that the required weighted distribution of virtual inertia response and fast frequency response is actually provided to the power grid. Accordingly, the electrical storage devices 5 may replace conventional inertia providing units with regard to ensuring stability of the power grid, and thereby it is possible to increase the penetration of renewable energy generators in the power grid.

Figure 2:
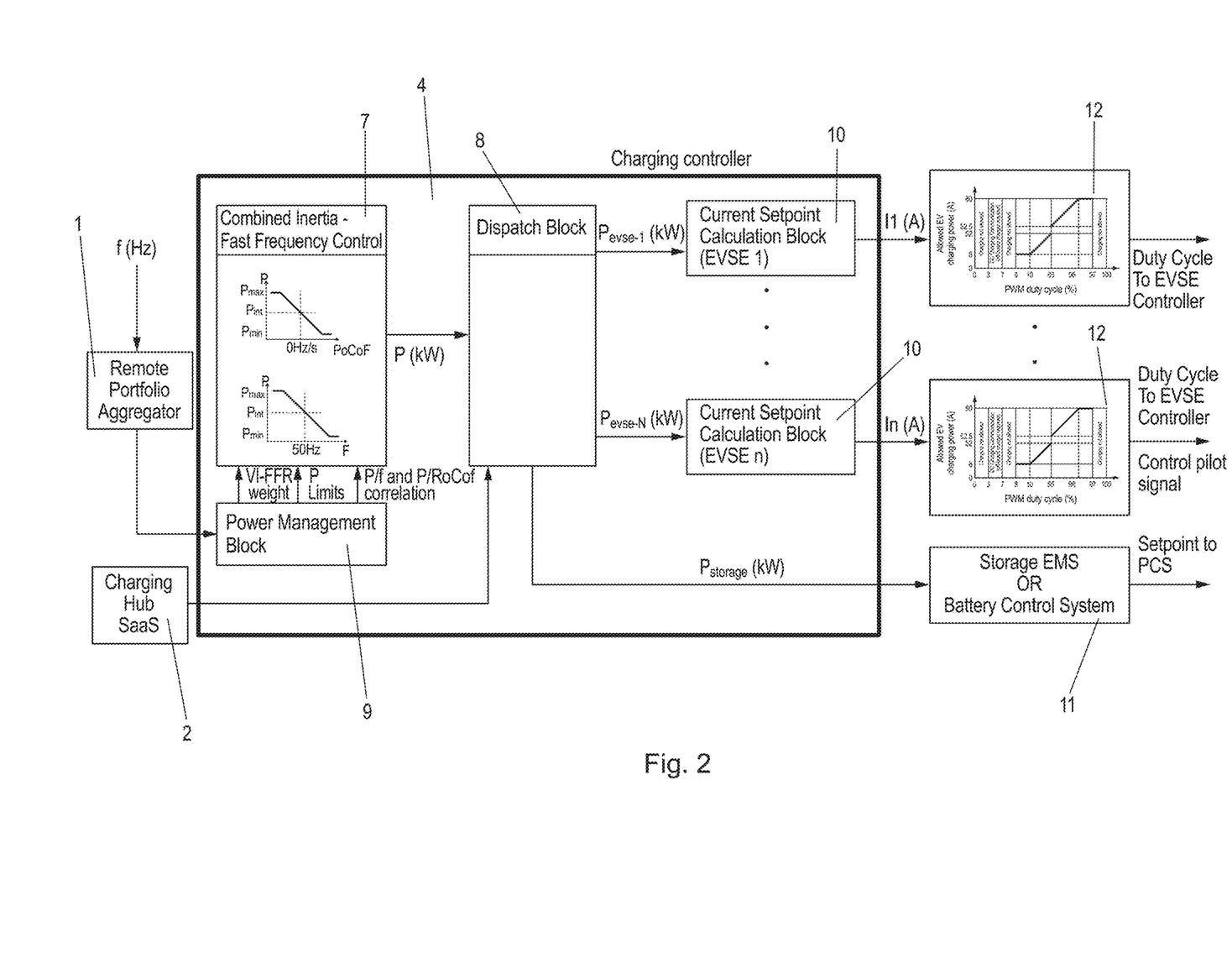
FIG. 2 is a block diagram illustrating a method according to a second embodiment of the invention.

FIG. 2 is a block diagram illustrating a method according to a second embodiment of the invention. An aggregator 1 is in communicative connection with a charging hub SaaS 2 and a power management block 9 forming part of a charging controller 4. The charging controller 4 is arranged to control the charging state of at least one electrical storage device. In FIG. 2, one of the electrical storage devices is in the form of a battery, and the remaining electrical storage devices, two of which are indicated, are in the form of electrical vehicles.

The charging hub SaaS 2 is capable of obtaining information regarding the electrical storage device, e.g. in the form of charging pattern, a power capacity, charging state, availability for charging, etc. This could, e.g., be obtained in the manner described above with reference to FIG. 1, i.e. via a direct communicative connection with the electrical storage device and/or via an external application.

Thus, the charging hub SaaS 2 obtains various information regarding the electrical storage device from various sources, e.g. directly from the electrical storage device.

The retrieved information regarding the electrical storage device is provided from the charging hub SaaS 2 to the aggregator 1.

The aggregator 1 further receives frequency measurements. The frequency measurements may, e.g., be a frequency measured in a power grid (not shown). Other kinds of measurements which provide information regarding the state of the power grid, such as frequency, active power, reactive power, voltage, market information, etc., may also be measured and provided to the aggregator 1.

Thus, the aggregator 1 receives information regarding the electrical storage devices, via the charging hub SaaS 2, as well as information regarding the frequency, and possibly further information regarding the power grid.

Based on this information, the aggregator 1 derives a weighted distribution of virtual inertia response and fast frequency response to be provided to the power grid. The weighted distribution is a measure for the ratio between virtual inertia response and fast frequency response which the at least one electrical storage device has to provide to the power grid.

The derived weighted distribution is provided from the aggregator 1 to the power management block 9. The power management block 9 further receives information regarding the electrical storage devices, from the charging hub SaaS 2.

The power management block 9 is arranged to provide the weighted distribution received by the aggregator 1 to a control algorithm 7, in the form of a combined inertia-fast frequency control, of the charging controller 4. The power management block 9 further provides additional information regarding active power limits and active power/frequency correlation to the control algorithm 7.

The charging hub controller 4 derives a total power available for charging the at least one electrical storage device, in accordance with the weighted distribution, and using the control algorithm 7, e.g. in the manner described above with reference to FIG. 1. The total power available is a measure of the amount of power which the charging hub controller 4 has at its disposal for charging the at least one electrical storage device. Since the total available power is derived based on the weighted distribution, it reflects this distribution, and is therefore a measure of the amount of virtual inertia response and fast frequency response to be provided to the power grid by the electrical storage device.

The derived total available power is provided from the control algorithm 7 to a dispatch block 8 forming part of the charging controller 4. The dispatch block 8 further receives information regarding the electrical storage devices from the charging hub SaaS 2.

Based on the total available power and the information regarding the electrical storage devices, the dispatch block 8 derives an active power setpoint for each of the electrical storage devices.

The derived active power setpoint related to the battery is supplied to a battery control system 11. Based thereon, the battery control system 11 provides a setpoint to a power conversion system (PCS). The setpoint provided to the PCS may, e.g., be the active power setpoint. As an alternative, it may be another kind of setpoint, which is derived from the active power setpoint. The charging state of the battery is then controlled based on the provided setpoint.

The active power setpoints related to the electric vehicles are provided to respective current setpoint calculation blocks 10.

The current setpoint calculation blocks 10 each derives a current setpoint for the corresponding electric vehicle based on the received active power setpoint. Each of the current setpoints derived in this manner represents a setpoint which specifies how the charging state of a given electrical storage device must be controlled.

The current setpoints are then supplied from the respective current setpoint calculation blocks 10 or corresponding duty cycle calculation blocks 12. The duty cycle calculation blocks 12 are arranged to derive a duty cycle of a PWM signal for the corresponding electric vehicle based on the received current setpoint. The duty cycle is the fraction of one period in which, e.g., a signal is active, wherein a period may be the time it takes for a signal to complete an on-and-off cycle. Thus, each duty cycle calculation block 12 determines the charging state of the corresponding electric vehicle. The charging states of the electric vehicles are then controlled in accordance with the respective duty cycles.

Since the active power setpoint for the battery and the duty cycles for the electric vehicles are derived on the basis of the active power setpoints, and the active power setpoints are derived on the basis of the total available power, which reflects the weighted distribution of virtual inertia response and fast frequency response to be provided to the power grid, it is ensured that all of the setpoints applied when controlling the charging states of the electrical storage devices, in combination, reflect the weighted distribution, even though it may not be reflected separately by each of the setpoints. Thereby, the electrical storage devices may replace conventional inertia providing units with regard to ensuring stability of the power grid, similarly to the situation described above with reference to FIG. 1.

Figure 3:
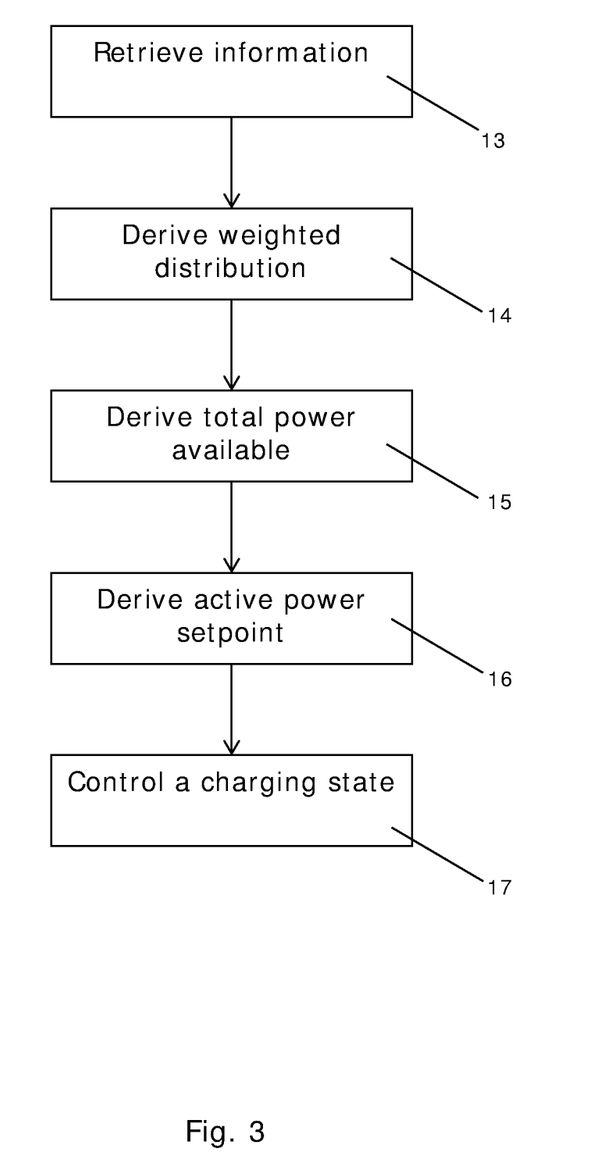
FIG. 3 is a flow chart illustrating a method according to an embodiment of the invention.

FIG. 3 is a flow chart illustrating a method according to an embodiment of the invention. The method is initiated at step 13, in which information regarding a power grid and at least one electrical storage device is retrieved by an aggregator.

At step 14, the aggregator derives a weighted distribution of virtual inertia response and fast frequency response to be provided to the power grid by the electrical storage device, on the basis of the retrieved information. The derived weighted distribution is thereafter provided to a charging controller together with the retrieved information.

At step 15, the charging controller derives a total available power for charging the at least one electrical storage device, in accordance with the weighted distribution. The total available power is a measure of the amount of power which the charging controller has at its disposal for charging the at least one electrical storage device.

At step 16, an active power setpoint for each of the at least one electrical storage device is derived on the basis of the total available power, and on the basis of the information regarding the at least one electrical storage device. The active power setpoint is a control parameter which indicates how the charging state of a given electrical storage device is to be controlled, including the amount of virtual inertia response and fast frequency response to be provided by each electrical storage device to the power grid.

At step 17, the charging state of each of the at least one electrical storage device is controlled based on the derived active power setpoint, e.g. in the manner described above with reference to FIG. 1 or 2.

Figure 4:
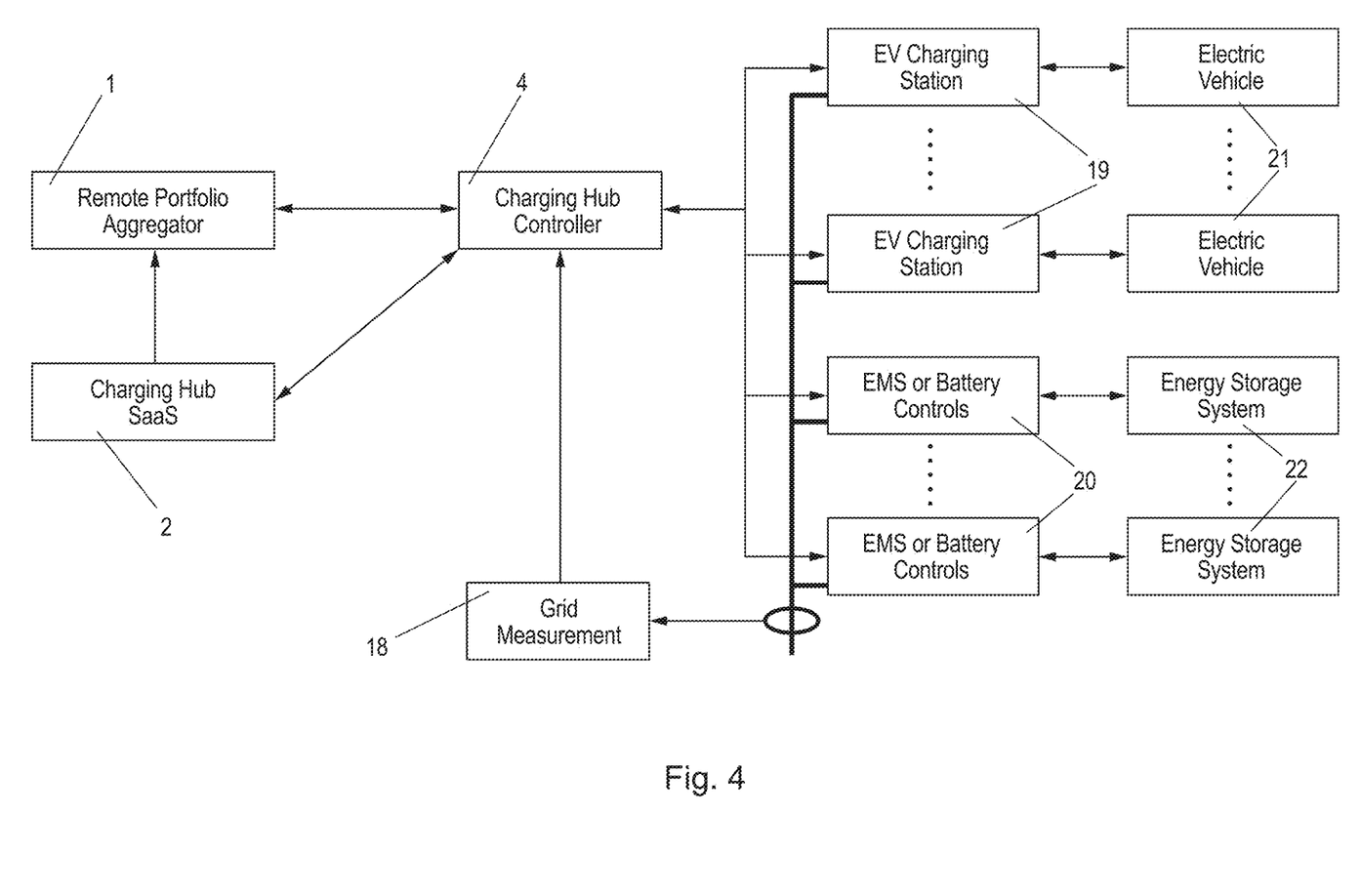
FIG. 4 is a schematic diagram illustrating a system according to an embodiment of the invention.

FIG. 4 is a diagram illustrating a system according to an embodiment of the invention. An aggregator 1, a charging hub SaaS 2 and a charging hub controller 4 are in communicative connection, e.g. in the manner described above with reference to FIG. 1 or 2.

The aggregator 1 receives grid measurements 18 via the charging hub controller 4. The grid measurements 18 may, e.g., be a frequency measured in a power grid. Other kinds of measurements which provide information regarding the state of the power grid, such as active power, reactive power, voltage, market information, etc., may also be measured and provided to the aggregator 1.

The aggregator 1 further receives information regarding at least two electric vehicles 21 and at least two batteries 22 via the charging hub SaaS 2, e.g. in the manner described above with reference to FIG. 1 or 2. The information regarding the electric vehicle 21 provided by the charging hub SaaS 2 could, e.g., include information regarding availability of the electric vehicle 21, a degradation model of the electric vehicle 21, and/or a minimum/maximum state of charge required by the electric vehicle 21. Such information could, e.g., be provided manually to the charging hub SaaS 2 by an owner or a user of the vehicle 21. The information provided by the charging hub SaaS 2 to the aggregator 1 may be used for optimization purposes only, in which case the aggregator 1 may obtain any information required in order to operate from other sources. Alternatively, the information provided by the charging hub SaaS 2 may be necessary for operation purposes.

Based on the received information, the aggregator 1 derives a weighted distribution of virtual inertia response and fast frequency response to be provided to the power grid. The weighted distribution is a measure for the ratio between virtual inertia response and fast frequency response which the at least one electrical storage device has to provide to the power grid.

The derived weighted distribution is provided from the aggregator 1 to the charging hub controller 4.

The charging hub controller 4 further receives grid measurements 18, e.g., in the form of frequency, active power, reactive power, voltage, market information, and/or other kinds measurements which provide information regarding the state of the power grid.

The charging hub controller 4 is further in communicative connection with a number of EV charging stations 19, two of which are shown, and a number of battery controls 20, two of which are shown. Thus, the charging hub controller 4 is capable of providing information to and receiving information from each of the EV charging stations 19 and each of the battery controls 20.

Thus, the charging hub controller 4 obtains various information from the aggregator 1, the charging hub SaaS 2, the EV charging station 19, the battery control 20, and the power grid, in the form of the grid measurement 18.

The charging hub controller 4 derives a total power available for charging the electric vehicles 21 and the batteries 22, in accordance with the weighted distribution, and based on the received information. The total power available is a measure of the amount of power which the charging hub controller 4 has at its disposal for charging the electric vehicles 21 and batteries 22. Since the total available power is derived based on the weighted distribution, it reflects this distribution, and is therefore a measure of the amount of virtual inertia response and fast frequency response to be provided to the power grid by the electric vehicles 21 and batteries 22.

The charging hub controller 4 further derives an active power setpoint for each of the EV charging stations 19 and each of the battery controls 20 based on the total available power, and on the basis of the information regarding the electric vehicles 21 and the batteries 22. Each of the active power setpoints specifies how the charging state of a given electric vehicle 21 or a given battery 22 must be controlled. Since the active power setpoints are derived on the basis of the total available power, which reflects the weighted distribution, the active power setpoints in combination also reflect this weighted distribution. It is therefore ensured that the combination of all active power setpoints reflects the weighted distribution, even though it may not be reflected separately by each of the active power setpoints.

The derived active power setpoints for each of the EV charging stations 19 and each of the battery controls 20 are provided from the charging hub controller 4 to the corresponding EV charging stations 19 and battery controls 20. Finally, the charging state of each of the electrical vehicles 21 and each of the batteries 22 are controlled based on the respective active power setpoints. Thereby, it is ensured that the charging states of the vehicles 21 and batteries 22, in combination, are controlled in a manner which ensures that the required weighted distribution of virtual inertia response and fast frequency response is actually provided to the power grid. Thereby the electric vehicles 21 and the batteries 22 may replace conventional inertia providing units with regard to ensuring stability of the power grid, similarly to the situation described above with reference to FIG. 1.

Figure 5:
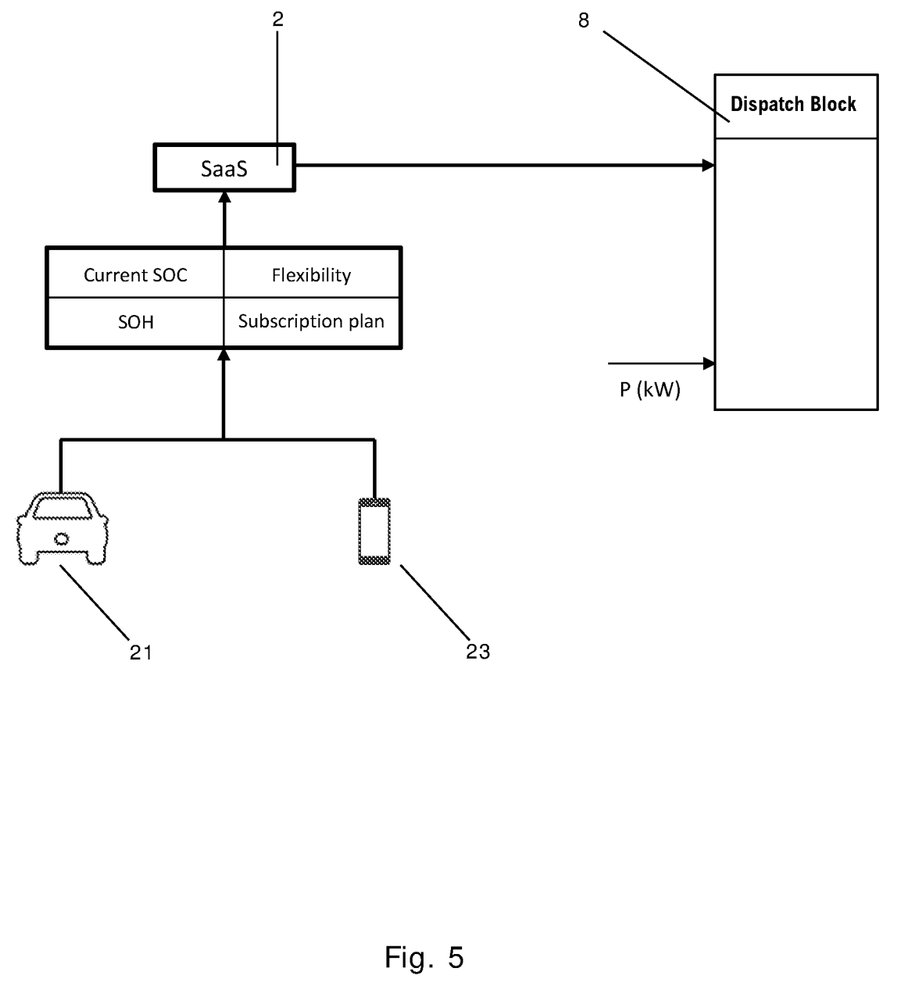
FIG. 5 is a block diagram illustrating a method according to an embodiment of the invention.

FIG. 5 is a block diagram illustrating a method according to an embodiment of the invention. A charging hub SaaS 2 is in communicative connection with an electrical storage device in the form of an electric vehicle 21 and a mobile device 23, such as a cell phone, a tablet or a laptop computer, possibly having appropriate software, e.g. in the form of an external application, installed thereon. The charging hub SaaS 2 is further in communicative connection with a dispatch block 8.

The charging hub SaaS 2 and the dispatch block 8 may, e.g., form part of the system illustrated in FIG. 1 or the system illustrated in FIG. 2, and they will therefore not be described in further detail here.

The charging hub SaaS 2 receives information regarding the electric vehicle 21 directly from the electric vehicle 21. This could, e.g., be by the electric vehicle 21 communicating relevant information, such as state of charge, state of health, etc., to the charging hub SaaS 2, e.g. by the electric vehicle 21, or a charging station to which the electric vehicle 21 is connected, pushing this information to the charging hub SaaS 2. Alternatively or additionally, the charging hub SaaS 2 may retrieve this information, e.g. by monitoring the electric vehicle 21 or by contacting the electric vehicle 21 at specific points in time.

The state of charge indicates the level of charge of the electric vehicle 21 relative to its power capacity, i.e., how much energy is stored in the electric vehicle 21, and how much free storing capacity each electrical storage device possesses.

The state of health indicates the condition of a battery and its ability to deliver a specified performance, compared to its ideal conditions, i.e. how much of the available lifetime energy throughput of the battery has been consumed, and how much is left.

Furthermore, the charging hub SaaS 2 receives information regarding the electric vehicle 21 from the mobile device 23. Such information may be provided manually by a user or an owner of the electric vehicle 21, e.g. by the user or owner entering the information via an app running on the mobile device 23. Such information may advantageously relate to expected availability of the electric vehicle 21, time constraints for fully charge of the electric vehicle 21, subscription plans of the electric vehicle 21, etc.

Thus, information regarding the current state of the electric vehicle 21 may be provided and/or monitored by the charging hub SaaS 2, and information regarding the use of the electric vehicle 21 may be manually provided by the owner or user of the electric vehicle 21 via a mobile device 23.

Figure 6:
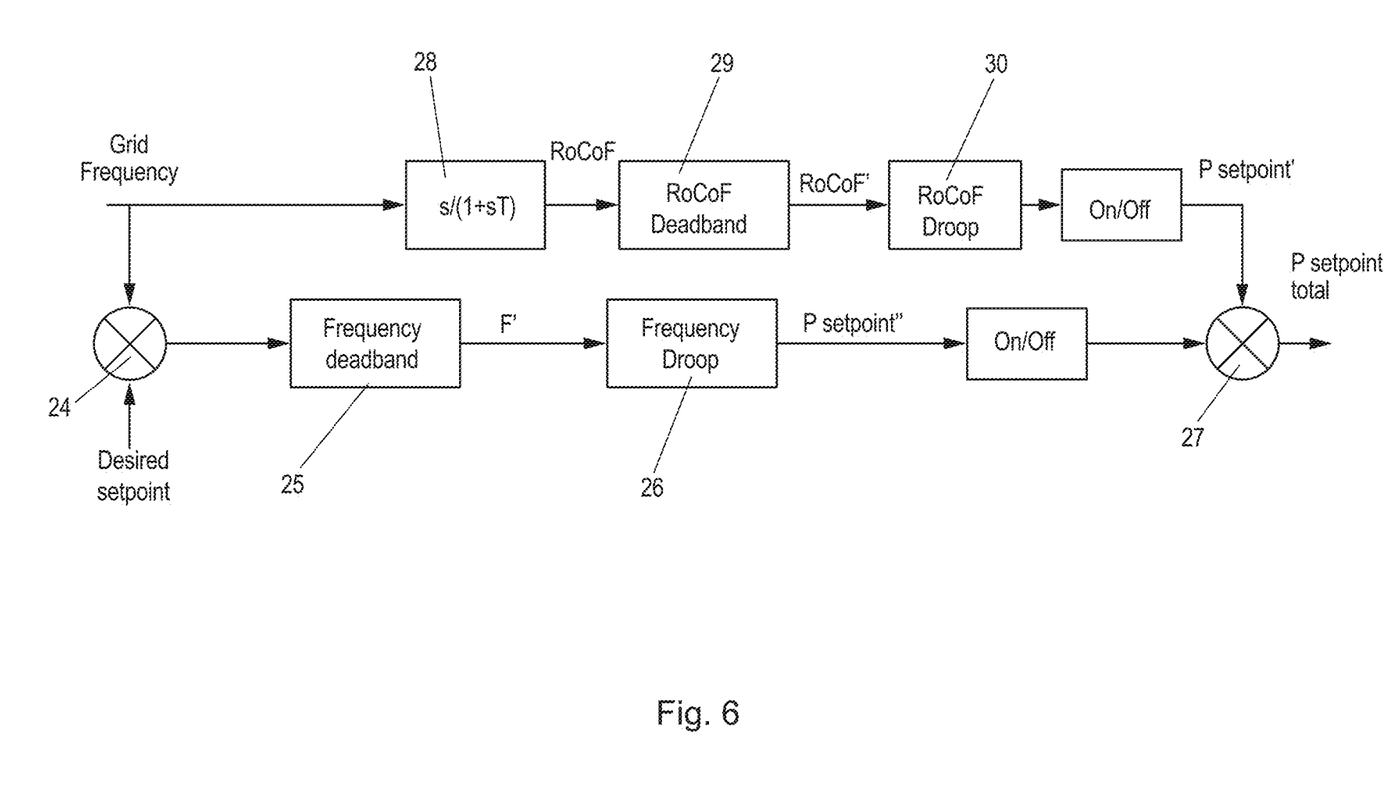
FIG. 6 is a diagrammatic illustration of a method according to an embodiment of the invention.

FIG. 6 is a diagrammatic illustration of a method according to an embodiment of the invention. A grid frequency is compared to a desired setpoint for the grid frequency, e.g. in the form of a nominal grid frequency, at comparator 24. Thereby a frequency deviation is derived. At 25 it is investigated whether or not the frequency deviation is within a specified frequency deadband, and at 26 a frequency droop is obtained. Based thereon, a power setpoint which represents a required fast frequency response is derived and supplied to summation point 27.

Furthermore, a gradient of the frequency deviation is obtained at 28, thereby obtaining a rate of change of frequency (RoCoF). At 29 it is investigated whether or not the RoCoF is within a specified RoCoF deadband, and at 30 a RoCoF droop is obtained. Based thereon, a power setpoint which represents a required virtual inertia response is derived and supplied to the summation point 27.

At summation point 27, at total power setpoint is derived, based on the received power setpoints representing required fast frequency response and virtual inertia response, respectively. The total power setpoint, thus, reflects a weighted distribution of virtual inertia response and fast frequency response to be provided to the power grid.

The derived total power setpoint is subsequently applied for generating individual power setpoints for electrical storage devices which are to be controlled in order to provide the required fast frequency response and virtual inertia response.

The invention claimed is:

1. A method for controlling charging of at least one electrical storage device, the method comprising:
    providing an aggregator arranged in communicative connection with a power grid and the at least one electrical storage device;
    the aggregator retrieving information regarding the power grid and the at least one electrical storage device;
    the aggregator deriving a weighted distribution of virtual inertia response and fast frequency response to be provided to the power grid by the electrical storage devices, on the basis of the retrieved information;
    the aggregator providing the derived weighted distribution of virtual inertia response and fast frequency response to a charging controller;
    the charging controller deriving a total power available for charging the at least one electrical storage device, in accordance with the weighted distribution;
    deriving an active power setpoint for each of the at least one electrical storage device on the basis of the total available power, and on the basis of the information regarding the at least one electrical storage device; and
    controlling a charging state of each of the at least one electrical storage device based on the derived active power setpoint.

2. The method of claim 1, wherein at least two electrical storage devices are communicatively connected to the aggregator, and wherein the charging state of the at least two electrical storage devices are being controlled.

3. The method of claim 2, wherein the charging controller is a charging hub controller being arranged to control the charging state of the at least two electrical storage devices.

4. The method of claim 1, wherein at least one of the electrical storage device(s) is an electric vehicle.

5. The method of claim 1, wherein at least one of the electrical storage device(s) is a battery.

6. The method of claim 1, wherein the information regarding the power grid comprises a grid frequency.

7. The method of claim 1, wherein the information regarding the power grid comprises information regarding active power.

8. The method of claim 1, further comprising deriving a current setpoint for each of the at least one electrical storage device based on the derived active power setpoint, and wherein controlling a charging state of each of the at least one electrical storage device is further based on the current setpoint.

9. The method of claim 8, wherein deriving a current setpoint for each of the at least one electrical storage device includes deriving a duty cycle of a PWM signal.

10. The method of claim 1, wherein at least two electrical storage devices are communicatively connected to the aggregator, and wherein deriving the active power setpoint for the at least one electrical storage device further comprises:

selecting at least one first electrical storage device for providing virtual inertia response and at least one second electrical storage device for providing fast frequency response, in accordance with the weighted distribution, and on the basis of the information regarding the electrical storage devices;

deriving an active power setpoint for each of the first electrical storage devices being purely virtual inertia response; and deriving an active power setpoint for each of the second electrical storage devices being purely fast frequency response.

11. The method of claim 1, wherein the information regarding the at least one electrical storage device is provided to the aggregator by a Software-as-a-service (SaaS) platform.

12. The method of claim 1, wherein the controlling a charging state of each of the at least one electrical storage device comprises charging at least one of the at least one electrical storage device.

13. The method of claim 1, wherein the controlling a charging state of each of the at least one electrical storage device comprises discharging at least one of the at least one electrical storage device, thereby providing active power support to the power grid.

14. The method of claim 13, wherein at least one of the at least one electrical storage device is an electric vehicle with bidirectional charging capability, wherein the information regarding the at least one electrical storage device comprises information regarding the charging state of the electric vehicle with bidirectional charging capability, and wherein the discharging the electric vehicle is only performed if the charging state of the electric vehicle is above a predefined threshold value.

15. The method of claim 1, wherein the information regarding the at least one electrical storage device comprises information regarding the charging state for at least some of the at least one electrical storage device.

16. The method of claim 1, wherein the deriving a weighted distribution of virtual inertia response and fast frequency response is repeated at predefined time intervals.

17. A system for charging at least one electrical storage device, the system comprising:

an aggregator being configured to retrieve information from a power grid and the at least one electrical storage device, and to derive, on the basis of the retrieved information, a weighted distribution of virtual inertia response and fast frequency response to be provided to the power grid;

a charging controller arranged in communication with the aggregator to receive the derived weighted distribution, and configured to derive, from the received derived weighted distribution, a total power available for charging and an active power setpoint for each of the at least one electrical storage device, wherein the charging of the at least one electrical storage device is controlled in accordance with an operation, comprising:

deriving an active power setpoint for each of the at least one electrical storage device on the basis of the total available power, and on the basis of the information regarding the at least one electrical storage device; and controlling a charging state of each of the at least one electrical storage device based on the derived active power setpoint.

18. The system of claim 17, wherein the charging controller is a charging hub controller being arranged to control the charging state of the at least one electrical storage device.

19. The system of claim 17, wherein the at least one electrical storage device is an electric vehicle.

20. The system of claim 17, wherein the at least one electrical storage device is a battery.

* * * * *